US011989557B2

(12) United States Patent
Liang et al.

(10) Patent No.: US 11,989,557 B2
(45) Date of Patent: May 21, 2024

(54) LARGE DATA READ TECHNIQUES

(71) Applicant: Lodestar Licensing Group, LLC, Evanston, IL (US)

(72) Inventors: Qing Liang, Boise, ID (US); Nadav Grosz, Broomfield, CO (US)

(*) Notice: Subject to any disclaimer, the term of this patent is extended or adjusted under 35 U.S.C. 154(b) by 0 days.

(21) Appl. No.: 18/144,569

(22) Filed: May 8, 2023

(65) Prior Publication Data

US 2023/0418607 A1 Dec. 28, 2023

Related U.S. Application Data

(63) Continuation of application No. 17/558,140, filed on Dec. 21, 2021, now Pat. No. 11,720,359, which is a continuation of application No. 16/565,021, filed on Sep. 9, 2019, now Pat. No. 11,210,093.

(60) Provisional application No. 62/861,144, filed on Jun. 13, 2019, provisional application No. 62/830,935, filed on Apr. 8, 2019.

(51) Int. Cl.
| G06F 12/00 | (2006.01) |
| G06F 3/06 | (2006.01) |
| G06F 9/30 | (2018.01) |
| G06F 9/48 | (2006.01) |
| G06F 12/1009 | (2016.01) |

(52) U.S. Cl.
CPC ........ G06F 9/30047 (2013.01); G06F 3/0613 (2013.01); G06F 3/0617 (2013.01); G06F 3/0646 (2013.01); G06F 3/0659 (2013.01); G06F 3/0679 (2013.01); G06F 9/4806 (2013.01); G06F 12/1009 (2013.01); G06F 2212/7201 (2013.01)

(58) Field of Classification Search
CPC .. G06F 9/30047; G06F 3/0613; G06F 3/0617; G06F 3/0646; G06F 3/0659; G06F 3/067; G06F 9/4806; G06F 12/1009; G06F 2212/7201
See application file for complete search history.

(56) References Cited

U.S. PATENT DOCUMENTS

| 5,768,548 A | 6/1998 | Young et al. |
| 6,571,318 B1 | 5/2003 | Sander et al. |
| 6,636,927 B1 | 10/2003 | Peters et al. |
| 6,976,147 B1 | 12/2005 | Isaac et al. |

(Continued)

FOREIGN PATENT DOCUMENTS

| CN | 105027213 A | 11/2015 |
| CN | 105930278 A | 9/2016 |

(Continued)

OTHER PUBLICATIONS

"Chinese Application Serial No. 202080034873.8, Voluntary Amendment filed Apr. 12, 2022", w/English Claims, 19 pgs.
"Chinese Application Serial No. 202080034873.8, Office Action dated Jun. 17, 2022", w/ English translation, 6 pgs.
"Chinese Application Serial No. 202080034873.8, Response filed Oct. 31, 2022 to Office Action dated Jun. 17, 2022", with English claims, 14 pages.

(Continued)

Primary Examiner — John A Lane
(74) Attorney, Agent, or Firm — Fletcher Yoder, P.C.

(57) ABSTRACT

Devices and techniques are disclosed herein for more efficiently exchanging large amounts of data between a host and a storage system. In an example, a read command can optionally include a read-type indicator. The read-type indicator can allow for exchange of a large amount of data between the host and the storage system using a single read command.

20 Claims, 4 Drawing Sheets

(56) References Cited

U.S. PATENT DOCUMENTS

| | | | |
|---|---|---|---|
| 8,078,805 | B1 | 12/2011 | Smirnov et al. |
| 11,210,093 | B2 | 12/2021 | Liang et al. |
| 11,231,928 | B2 | 1/2022 | Liang et al. |
| 2002/0087801 | A1 | 7/2002 | Bogin et al. |
| 2004/0128449 | A1 | 7/2004 | Osborne et al. |
| 2008/0288751 | A1 | 11/2008 | Kocev |
| 2009/0077304 | A1 | 3/2009 | Hong et al. |
| 2009/0138661 | A1 | 5/2009 | Lauterbach |
| 2009/0157980 | A1 | 6/2009 | Bruce |
| 2010/0306405 | A1 | 12/2010 | Galles |
| 2012/0185651 | A1 | 7/2012 | Kimori |
| 2014/0359221 | A1 | 12/2014 | Kalamatianos et al. |
| 2015/0378780 | A1 | 12/2015 | Busaba et al. |
| 2017/0123988 | A1 | 5/2017 | Chun et al. |
| 2017/0286305 | A1 | 10/2017 | Kalwitz |
| 2018/0157441 | A1 | 6/2018 | Bains et al. |
| 2019/0196716 | A1 | 6/2019 | Xiao et al. |
| 2019/0369909 | A1* | 12/2019 | Li .................. G06F 3/0656 |
| 2020/0004430 | A1 | 1/2020 | Navon et al. |
| 2020/0319823 | A1 | 10/2020 | Liang et al. |
| 2020/0319882 | A1 | 10/2020 | Liang et al. |
| 2020/0341764 | A1 | 10/2020 | Jacob et al. |
| 2022/0113970 | A1 | 4/2022 | Liang et al. |
| 2022/0147281 | A1 | 5/2022 | Liang et al. |

FOREIGN PATENT DOCUMENTS

| | | |
|---|---|---|
| CN | 109240942 A | 1/2019 |
| CN | 109426619 A | 3/2019 |
| CN | 113841128 A | 12/2021 |
| CN | 113841128 B | 3/2023 |
| JP | 2010287962 A | 12/2010 |
| WO | WO-2020210163 A1 | 10/2020 |

OTHER PUBLICATIONS

"European Application Serial No. 20787438.9, Extended European Search Report dated Dec. 7, 2022", 12 pgs.

"European Application Serial No. 20787438.9, Response to Communication pursuant to Rules 161 and 162 filed May 27, 2022", 13 pgs.

"International Application Serial No. PCT/US2020/026893, International Preliminary Report on Patentability dated Oct. 21, 2021", 9 pgs.

"International Application Serial No. PCT/US2020/026893, International Search Report dated Jul. 28, 2020", 3 pgs.

"International Application Serial No. PCT/US2020/026893, Written Opinion dated Jul. 28, 2020", 7 pgs.

* cited by examiner

| BYTE/BIT | 7 | 6 | 5 | 4 | 3 | 2 | 1 | 0 |
|---|---|---|---|---|---|---|---|---|
| 0 | COMMAND CODE ||||||||
| 1 | RESERVED |||||| READ-TYPE ||
| 2 | FIRST LOCATION IDENTIFIER ||||||||
| ... |  ||||||||
| 5 |  ||||||||
| 6 | TRANSFER LENGTH/ 2ND LOCATION IDENTIFIER ||||||||
| ... |  ||||||||
| 9 |  ||||||||
| 10 | RESERVED ||||||||
| 11 | PARAMETER LIST LENGTH ||||||||
| ... |  ||||||||
| 14 |  ||||||||
| 15 | END COMMAND CODE ||||||||

*FIG. 3A*

| BYTE/BIT | 7 | 6 | 5 | 4 | 3 | 2 | 1 | 0 |
|---|---|---|---|---|---|---|---|---|
| 0 | LOCATION IDENTIFIER ||||||||
| ... |  ||||||||
| 7 |  ||||||||
| 8 | LOCATION IDENTIFIER ||||||||
| ... |  ||||||||
| 15 |  ||||||||
| ... | ... ||||||||
| N-7 | LOCATION IDENTIFIER ||||||||
| ... |  ||||||||
| N |  ||||||||

*FIG. 3B*

LARGE DATA READ TECHNIQUES

CLAIM OF PRIORITY AND RELATED APPLICATIONS

This application is a continuation of U.S. application Ser. No. 17/558,140, filed Dec. 21, 2021, which is a continuation of U.S. application Ser. No. 16/565,021, filed Sep. 9, 2019, now issued as U.S. Pat. No. 11,210,093, which claims the benefit of priority to Liang et al., U.S. Provisional Patent Application Ser. No. 62/830,935, filed on Apr. 8, 2019, and to Liang et al., U.S. Provisional Patent Application Ser. No. 62/861,144, filed on Jun. 13, 2019, each of which are hereby incorporated by reference herein in their entirety.

TECHNICAL FIELD

Examples of the disclosure relate generally to electronic systems, and more specifically, relate to techniques for accessing memory of electronic systems.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), in various forms, such as dynamic random-access memory (DRAM), or synchronous dynamic random-access memory (SDRAM), among others. Non-volatile memory may retain stored data when not powered (may be implemented as read-only memory (ROM) in some cases) and may include one or more storage technologies, such as flash memory (e.g., NAND or NOR flash), electrically erasable programmable ROM (EEPROM), static RAM (SRAM), Ferroelectric RAM (FeRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others. Systems incorporating memory may include multiple memory devices or memory systems implementing multiple storage technologies.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

The memory or storage system of an electronic device can affect a number of performance metrics that can sway a user between choosing one electronic device over a competitor's electronic device. Data storage and retrieval delays are two such metrics. Some memory or storage systems, such as flash memory, can limit the amount of data that can be exchanged via certain commands such as a read command or a write command. The atomic unit of the storage system is often the limit of data that can be affected by a single read command, for example. In certain devices, using single, atomic-unit data transfers in response to, for example, a read command can efficiently handle up to about 70% of the read requests. Opportunities exist for more efficient handling of at least a portion of the other 30% or more of read requests.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A and 3B illustrate generally an example command structure according to the present subject matter.

DETAILED DESCRIPTION

Figure 1:
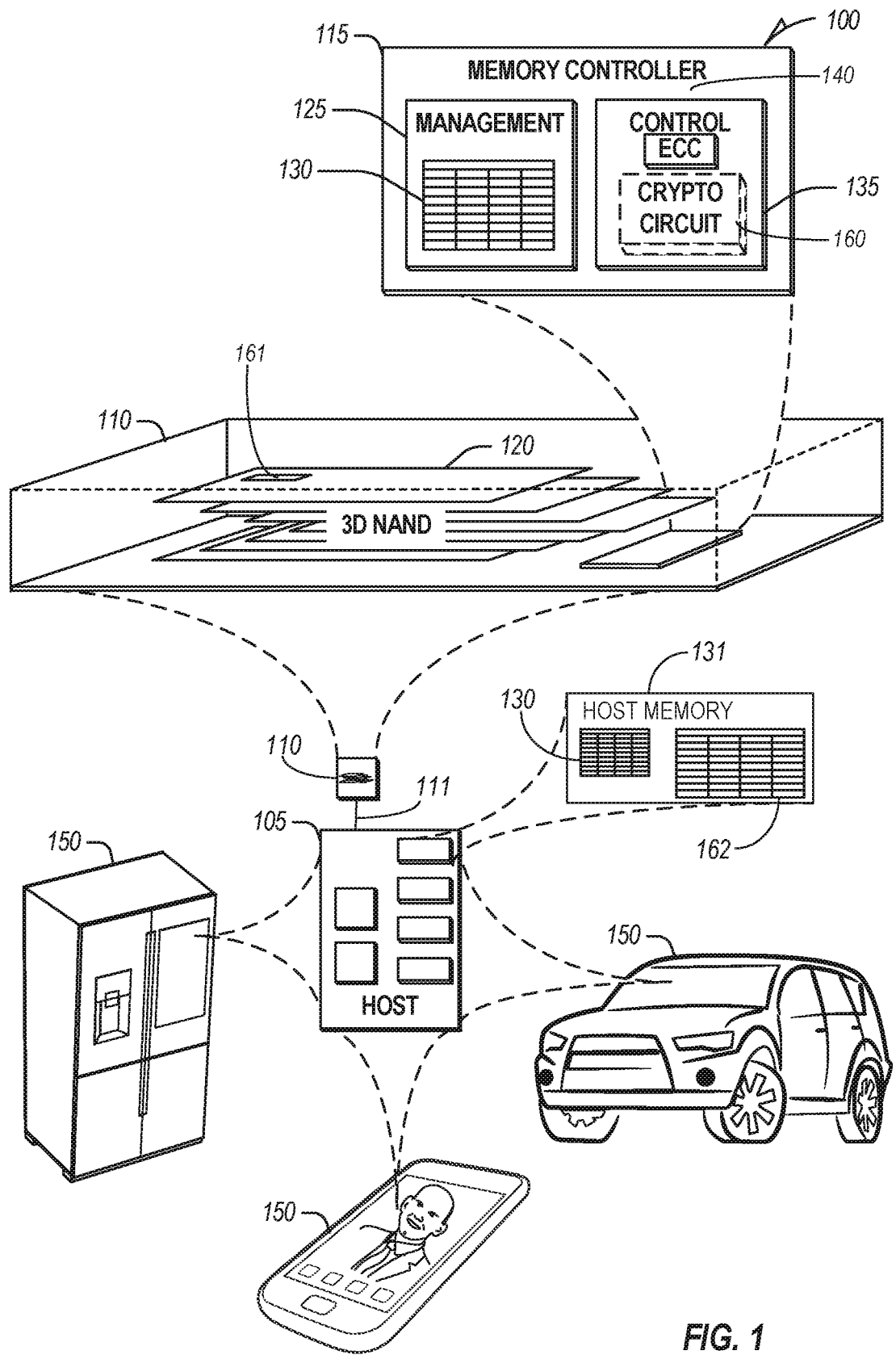
FIG. 1 illustrates an example system an environment including a memory device upon which one or more examples of the present subject matter may be implemented.

Storage systems, such as but not limited to, NAND memory, can use a logical-to-physical map (L2P) table to translate logical addresses of a host device, often referred to as logical block addresses (LBAs), to corresponding memory addresses, or physical addresses (PAs) of the storage system. In flash storage systems, the L2P table may also be referred to as flash translation layer (FTL). LBAs can be the logical addresses used by a host for managing data. Mobile storage devices typically have a cache with constrained size, and thus often lack memory to store an entire mapping table. Therefore, portions of the mapping table(s) can be retrieved from the flash memory on demand, which can cause random read performance degradation.

In certain examples, techniques described herein can optionally enable use of host-resident memory, in addition to memory cells of a memory device coupled to the host, as a cache for a L2P mapping table. Under a host-resident L2P, L2P data can be read from host memory faster than from flash memory, and the host can initiate a memory operation by retrieving a physical address (PA) of the flash memory and including the PA in a memory request to the flash memory. The PA can be retrieved by the host using the L2P memory cache of the host and the LBA of the host. Upon receiving the memory request, the flash memory system can immediately retrieve the data associated with the physical address without the delay associated with accessing the flash memory-based mapping table and using the LBA to obtain the physical address.

In certain implementations of a host-resident L2P, improvements in random read workload performance can be significant. However, the improvements in accelerated read capabilities can be limited to single atomic chucks of the host/storage system because many storage devices do not possess processing capabilities that facilitate files or other collections of related data. For example, when the host commands data to be stored in a storage device, the host can provide a write command with a logical block address and an amount of data. Conventional storage devices, including but not limited to, flash storage devices employing host-based FTL systems, store the amount of data in atomic units. Therefore, as an example, and not by way of limitation, for a system that has an atomic unit of 4 k, a write command configured to store 64 k of data will result in 16 4 k chucks of that data being individually stored on the memory of the storage device. Similarly, a single read command can sense and transfer a single atomic unit of data in conventional flash storage system. As such, for a given host file, the data stored on the storage device may not be programmed sequentially into the memory of the storage device. Therefore, even with host-based FTL capabilities, when the host wishes to read a large file, multiple individual read commands, each with an LBA or physical address are provided to the storage device for each atomic chuck of data of the large file of the host. The present inventor has recognized techniques to further improve exchange of data between a host and a storage device where the data is larger than the atomic size of the system and can be beneficial for overall performance.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices the controller functionality may be implemented on one or more die also incorporating a memory array, or on a separate die. In other examples, one or more memory devices may be combined with controller functionality to form a solid-stage drive (SSD) storage volume. The term "memory system," is used herein as inclusive of one or more memory die, and any controller functionality for such memory die, when present; and thus includes individual memory devices, managed memory devices, and SSDs.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard. Managed NAND devices can be used as primary or ancillary memory in various forms of electronic devices, and are commonly used in mobile devices.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

FIG. 1 illustrates an example of an environment 100 including a host 105 and a memory device 110 configured to communicate over a communication interface. The host 105 or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor). In an example, the memory device 110 can be a discrete memory device. In certain examples, one or more memory die of the memory array 120 can include a first complete L2P table 161 for mapping logical block addresses of the host with physical addresses of the flash memory.

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a UFS interface, an eMMCT™ interface, or one or more other connectors or interfaces. The host 105 can include a host system, an electronic device, a processor, a memory card reader, or one or more other electronic devices external to the memory device 110. In some examples, the host 105 may be a machine having some portion, or all, of the components discussed in reference to the machine 400 of FIG. 4. Data may be transferred between the memory device 110 and other components over an input/output (I/O) bus that may include one or more latches for temporarily storing the data as it is being transferred (e.g., before being read or written from/to a memory array).

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), caches, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of memory controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. Array controller 135 may transmit detected BER information to memory manager 125 for storage and tracking. The memory controller 115 may include a command queue (not shown) that tracks memory commands received from a host. Commands in the queue may be executed by memory controller 115 in a first-in first-out (FIFO) manner, stack manner, out of sequence, according to priority, or in any other suitable order.

In certain examples, the memory device 110 can optionally include a cryptography circuit 160 in association with the memory array 120. In certain examples, the cryptography circuit 160 can include an encryption circuit, a decryption circuit, or a combination thereof. In some implementations, memory controller 115 of memory device 110 may include control circuitry configured to implement the functions of the cryptography circuit 160. In other implementations, the cryptography circuit 160 may include an independent control circuitry for implementing the described functionality. In yet other implementations, control circuitry may be divided between the cryptography circuit 160 and memory controller 115 to implement the described functions of the cryptography circuit 160. In the depicted example, the array controller 135 forms a portion of the memory controller 115, and the cryptography circuit 160 forms a portion of the array controller. In other implementations, cryptography circuit 160 may be external, and/or outside of array controller 135. For example, the cryptography circuit 160 (or any individual components thereof), may be an independent component coupled to one or more components in environment 100. However physically located, the structures providing the additional functionality of the cryptography circuit 160, function to verify physical addresses provided by the host 105 to prevent erroneous or malicious access to the memory device and to provide opportunities for the host to refresh the host-resident mapping table information to align the mapping information with the mapping information of the memory device during host-resident FTL operation of the environment 100.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device.

In certain examples, the host can include second memory 131. The second memory 131 is not a flash-type memory device. In certain examples, the second memory 131 can be used to store and maintain a set of management tables 130. The management tables can include various information associated with one or more components of the memory device 110 (e.g., various information associated with a memory array or one or more memory cells coupled to the memory controller 115 and can include an L2P table). For example, the management tables 130 can include information regarding FTL mapping information, block age, block erase count, error history, error parameter information, host reset timeout value, memory operation command latencies, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

In certain examples, the second memory can include a second complete L2P table 162 for mapping logical block addresses of the host with physical addresses of the flash memory. In some examples, the environment 100 may include only one of the first complete L2P table 161, or the second complete L2P table 162.

As discussed above, the present inventors have recognized that current accelerated read techniques for conventional, atomic-based memory systems only work on single atomic chunks. For example, conventional atomic-based memory systems, including those implementing a host-based FTL, supply a separate LBA or PA for each atomic chunk of data. Such tedious and repetitive techniques can introduce substantial latency and power usage for large sequential reads (e.g., up to 512 KB=128 LBAs for mobile, larger for other workloads) when the atomic unit is considerably smaller (e.g., 4 k).

Figure 2:
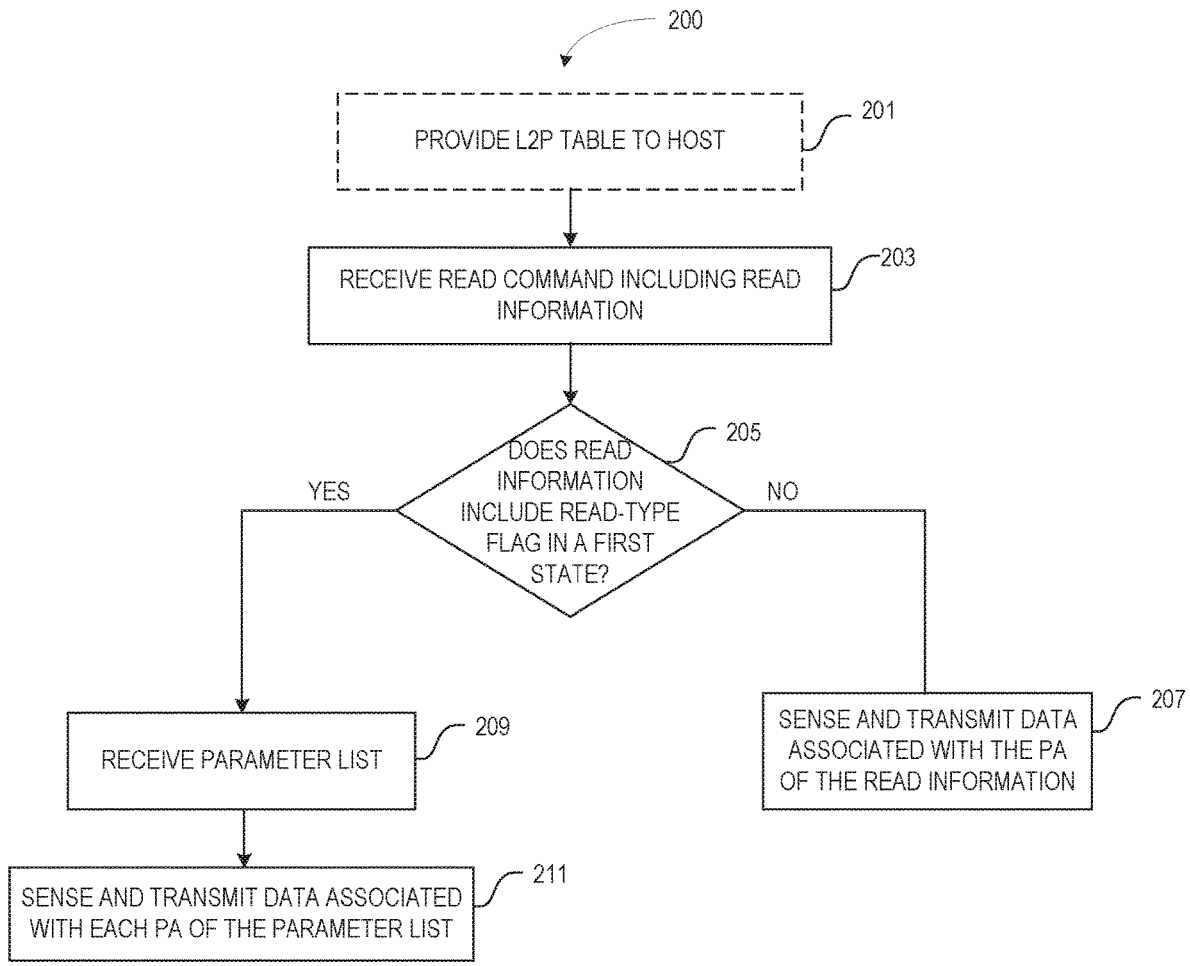
FIG. 2 illustrates generally a flowchart of an example method for executing read commands at a storage device.

FIG. 2 illustrates generally a flowchart of an example method 200 of reading data from a storage device according to the present subject matter. in certain examples, the method 200 can be employed on a system such as the example system illustrated of FIG. 1. At 201, mapping information of the storage device can optionally be provided to a host. In some examples, the mapping information can allow the host to, at least initially, determine where data is stored on the memory of the storage device. In certain examples, portions of the mapping information, such as the physical addresses of the memory of the storage device, can be encrypted to prevent malicious information from being stored on the storage device. At 203, a read command can be received at the storage device. The read command can include read information. In certain examples, the read information can include a LBA of the host. In some examples, the read information can include a PA of the memory of the storage device. In certain examples, the read information can include a read-type flag. In some examples, the read information does not include a read-type flag. In certain examples, the read-type flag is a binary-type flag, or a bit. At 205, the existence of the read-type flag or the existence of a read-type flag in a first state can be determined.

At 207, if the read data does not include a read-type flag, or the read-type flag is not in the first state, a single atomic unit of read-data associated with the read command can be sensed and transferred to the host to complete the execution of the read command. In some examples, either a LBA or a PA within the read information can be used to determine the location of the read data within the memory of the storage device. In some examples, a L2P table may be used to identify the physical address of the memory location of the data on the storage device. In some examples, an encrypted PA may be decrypted to identify the location of the read data within the memory of the storage device.

At 209, when the read information includes a read-type flag, and the read-type flag is in a first state, the storage device can receive a parameter list from the host. In certain examples, the read information can indicate a size of the parameter list, and the parameter list can include locations within the memory of the storage device for retrieving the requested read data. Although sensing and transferring may still occur via the atomic size of data for the system, a single read command can initiate multiple read transfers of multiple atomic chunks of data from the storage system to the host, thus eliminating the overhead associated with the host issuing a read command for each individual atomic chuck of read data.

FIG. 3A illustrates one example form of a read command according to the present subject matter. The example of FIG. 3A illustrates an example read command for a flash storage device but the scope of the present subject matter is not so limited. The command format can include an operation, or command code, to indicate the type of command (e.g., read, write, unmap, verify, etc.), a location identifier, data transfer length, one or more optional additional bytes reserved for future use or other commands, and an end command byte or code. For flash memory, some read commands can be as few as five bytes or up to 16 bytes or more. In certain examples, one or more bits of the additional bytes can be used as the read-type flag discussed above. The location identifier can include an LBA of the host, a PA of memory of the storage system, or an encrypted PA of memory of the storage system and can identify at least one location of the memory of the storage device from which to retrieve read data. For a conventional read command, the data transfer length may be replaced by a second location identifier associated with the first location identifier. For example, the first location identifier can include a LBA and the second location identifier can include a corresponding PA or a representation of a corresponding PA. When the read-type flag does not exist or is not in a first state, the read command of FIG. 3A is self-contained and forms a complete read command.

When the read-type flag is in the first state, the data transfer length indicates, for example, a number of contiguous LBAs to be read, and one or more bytes of the additional bytes can indicate a length of a parameter list associated with the read command. The parameter list can include the PAs associated with each of the PAs of the read command. In certain examples, receipt of the read command at the storage device can be immediately followed by receipt of the associated parameter list at the storage device.

FIG. 3B illustrates one example form of a parameter list according to the present subject matter. The parameter list can include one or more location identifiers for retrieving additional read data from the host in addition to or associated with the read data at the location identifier of the read command. The location identifiers can include an LBA of the host, a PA of memory of the storage system, or an encrypted PA of memory of the storage system and can identify at least one or more locations of the memory of the storage device from which to retrieve read data. In certain examples, one of the location identifiers of the parameter list can match or correspond with the location identifier of the read command of FIG. 3A to verify the parameter list is associated with the read command whether the read command is received with the parameter list or not. In such examples, if the parameter list does not include a matching location identifier, the parameter list can be ignored, or an error flag can be raised and optionally passed to the host.

Figure 4:
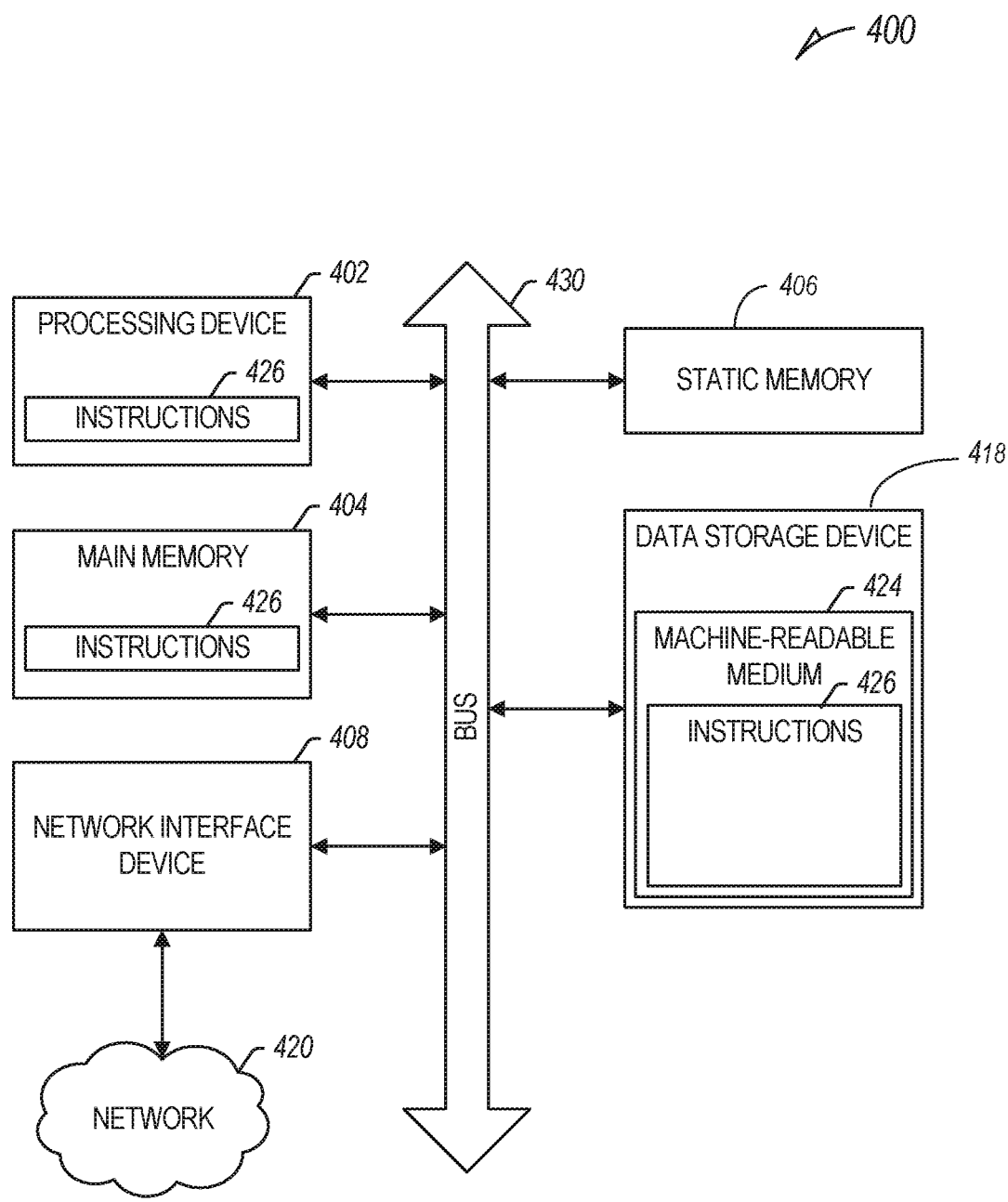
FIG. 4 illustrates a block diagram of an example machine upon which any one or more of the techniques (e.g., methodologies) discussed herein may perform.

FIG. 4 illustrates a block diagram of an example machine 400 upon which any one or more of the techniques (e.g., methodologies) discussed above with respect to FIGS. 1, 2, 3A and 3B may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 400 (e.g., the host 105, the memory device 110, etc.) may include a processing device 402 (e.g., a hardware processor, a central processing unit (CPU), a graphics processing unit (GPU), a hardware processor core, or any combination thereof, such as a memory controller of the memory device 110, etc.), a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a data storage system 418, some or all of which may communicate with each other via an interlink (e.g., bus) 430.

The processing device 402 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 can be configured to execute instructions 426 for performing the operations and steps discussed herein. The computer system 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 or within the processing device 402 during execution thereof by the computer system 400, the main memory 404 and the processing device 402 also constituting machine-readable storage media. The machine-readable storage medium 424, the data storage system 418, or the main memory 404 can correspond to the memory device 110 of FIG. 1.

In one implementation, the instructions 426 include instructions to implement functionality corresponding to one or more optional large read techniques discussed above with respect to FIGS. 1, 2, 3A and 3B. While the machine-readable storage medium 424 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 400 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 400 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 426 (e.g., software, programs, an operating system (OS), etc.) or other data are stored on the data storage device 418 can be accessed by the main memory 404 for use by the processing device 402. The main memory 404 (e.g., DRAM) is typically fast, but volatile, and thus a different type of storage than the data storage device 418 (e.g., an SSD), which is suitable for long-term storage, including while in an "off" condition. The instructions 426 or data in use by a user or the machine 400 are typically loaded in the main memory 404 for use by the processing device 402. When the main memory 404 is full, virtual space from the data storage device 418 can be allocated to supplement the main memory 404; however, because the data storage device 418 device is typically slower than the main memory 404, and write speeds are typically at least twice as slow as read speeds, use of virtual memory can greatly reduce user experience due to storage device latency (in contrast to the main memory 404, e.g., DRAM). Further, use of the data storage device 418 for virtual memory can greatly reduce the usable lifespan of the data storage device 418.

In contrast to virtual memory, virtual memory compression (e.g., the Linux™ kernel feature "ZRAM") uses part of the memory as compressed block storage to avoid paging to the data storage device 418. Paging takes place in the compressed block until it is necessary to write such data to the data storage device 418. Virtual memory compression increases the usable size of the main memory 404, while reducing wear on the data storage device 418.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 424 may further be transmitted or received over a network 420 using a transmission medium via the network interface device 408 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 408 may include one or more physical jacks (e.g., Ethernet, coaxial, or phone jacks) or one or more antennas to connect to the network 420. In an example, the network interface device 408 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

ADDITIONAL NOTES AND EXAMPLES

Example 1 is a memory structure, comprising: a controller configured to: operate the memory structure in a first mode to perform a read operation of a first number of bytes of data in response to a first configuration of a read command; operate the memory structure in a second mode to perform a read operation of a second number of bytes of data, the second number greater than the first number in response to a second configuration of the read command; and wherein the second configuration of the read command includes, a first one or more bits establishing a size of the second number.

In Example 2, the subject matter of Example 1 includes, wherein the second configuration of the read command includes a second one or more bits establishing a parameter list length.

In Example 3, the subject matter of Example 2 includes, wherein the second configuration of the read command includes a parameter list, the parameter list including one or more read locations within the memory structure.

In Example 4, the subject matter of Examples 1-3 includes, wherein each of the one or more read locations include a first number of bytes of data of the second number of bytes of data.

In Example 5, the subject matter of Examples 1-4 includes, wherein the first configuration includes a first read location including the first number of bytes of data.

In Example 6, the subject matter of Examples 1-5 includes, wherein the second configuration includes a first read location including a first number of bytes of data of the second number of bytes of data.

In Example 7, the subject matter of Examples 1-6 includes, wherein a state of a bit of a read command received at the memory structure determines when the read command is in the first configuration or the second configuration.

In Example 8, the subject matter of Examples 1-7 includes, flash memory coupled to the controller, the flash memory including the first number of bytes of data or the second number of bytes of data.

Example 9 is a method comprising: operating a memory structure in a first mode to perform a read operation of a first number of bytes of data in response to a first configuration of a read command; operating the memory structure in a second mode to perform a read operation of a second number of bytes of data, the second number greater than the first number in response to a second configuration of the read command; and wherein the second configuration of the read command includes, a first one or more bits establishing a size of the second number.

In Example 10, the subject matter of Example 9 includes, wherein the second configuration of the read command includes a second one or more bits establishing a parameter list length.

In Example 11, the subject matter of Example 10 includes, wherein the second configuration of the read command includes a parameter list, the parameter list including one or more read locations within the memory structure.

In Example 12, the subject matter of Examples 9-11 includes, wherein each of the one or more read locations include a first number of bytes of data of the second number of bytes of data.

In Example 13, the subject matter of Examples 9-12 includes, wherein the first configuration includes a first read location including the first number of bytes of data.

In Example 14, the subject matter of Examples 9-13 includes, wherein the second configuration includes a first read location including a first number of bytes of data of the second number of bytes of data.

In Example 15, the subject matter of Examples 9-14 includes, wherein a state of a bit of a read command received at the memory structure determines when the read command is in the first configuration or the second configuration.

Example 16 is a machine-readable medium, comprising instructions, which when executed by a processor of a flash memory device, cause the processor to perform operations comprising: operate the memory structure in a first mode to perform a read operation of a first number of bytes of data in response to a first configuration of a read command; operate the memory structure in a second mode to perform a read operation of a second number of bytes of data, the second number greater than the first number in response to a second configuration of the read command; and wherein the second configuration of the read command includes, a first one or more bits establishing a size of the second number.

In Example 17, the subject matter of Example 16 includes, wherein the second configuration of the read command includes a second one or more bits establishing a parameter list length.

In Example 18, the subject matter of Example 17 includes, wherein the second configuration of the read command includes a parameter list, the parameter list including one or more read locations within the memory structure.

In Example 19, the subject matter of Examples 16-18 includes, wherein each of the one or more read locations include a first number of bytes of data of the second number of bytes of data.

In Example 20, the subject matter of Examples 16-19 includes, wherein the first configuration includes a first read location including the first number of bytes of data.

In Example 21, the subject matter of Examples 16-20 includes, wherein the second configuration includes a first read location including a first number of bytes of data of the second number of bytes of data.

In Example 22, the subject matter of Examples 16-21 includes, wherein a state of a bit of a read command received at the memory structure determines when the read command is in the first configuration or the second configuration.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device comprising:
   a memory array; and
   a controller, configured to perform operations comprising:
   receiving a read command from a host device, wherein the read command comprises a location identifier for retrieving read data from the memory array;
   determining that the read command comprises an indication indicating a read-type;
   in response to the indication being a certain value:
   identifying a parameter list received from the host device, wherein the parameter list comprises one or more location identifiers for retrieving additional read data from the memory array;
   retrieving the read data and the additional read data from the memory array using the location identifier and the one or more location identifiers; and
   transmitting the read data and the additional read data to the host device.

2. The memory device of claim 1, wherein the location identifier comprises a logical block address of the read data.

3. The memory device of claim 1, wherein the location identifier comprises a he read data on the memory array.

4. The memory device of claim 1, wherein the operations further comprise:
   in response to the indication being another value different from the certain value:
   retrieving the read data from the memory array using the location identifier; and
   transmitting the read data to the host device.

5. The memory device of claim 1, wherein the one or more location identifiers comprises a physical address of the additional read data on the memory device.

6. The memory device of claim 1, wherein the one or more location identifiers comprise at least two non-contiguous addresses.

7. The memory device of claim 1, wherein the operations further comprise:

transmitting the read data and the additional read data to the host device without receiving any additional read command from the host device.

8. A controller of a memory device, the controller is configured to perform operations comprising:

receiving a read command from a host device, wherein the read command comprising a location identifier for retrieving read data;

determining that the read command comprises an indication indicating a read-type;

in response to the indication being a certain value:

identifying a parameter list received from the host device, wherein the parameter list comprises one or more location identifiers for retrieving additional read data;

retrieving the read data and the additional read data from the memory device using the location identifier and the one or more location identifiers; and transmitting the read data and the additional read data to the host device.

9. The controller of claim 8, wherein the location identifier comprises a logical block address of the read data.

10. The controller of claim 8, wherein the location identifier comprises a physical address of the read data on the memory device.

11. The controller of claim 8, wherein the operations further comprise:

in response to the indication being another value different from the certain value:

retrieving the read data from the memory device using the location identifier; and transmitting the read data to the host device.

12. The controller of claim 8, wherein the one or more location identifiers comprises a physical address of the additional read data on the memory device.

13. The controller of claim 8, wherein the one or more location identifiers comprise at least two non-contiguous addresses.

14. The controller of claim 8, wherein the operations further comprise:

transmitting the read data and the additional read data to the host device without receiving any additional read command from the host device.

15. A non-transitory machine-readable medium, storing instructions, which when executed by a memory device, causes the memory device to perform operations comprising:

receiving a read command from a host device, wherein the read command comprising a location identifier for retrieving read data;

determining that the read command comprises an indication indicating a read-type;

in response to the indication being a certain value:

identifying a parameter list received from the host device, wherein the parameter list comprises one or more location identifiers for retrieving additional read data;

retrieving the read data and the additional read data from the memory device using the location identifier and the one or more location identifiers; and transmitting the read data and the additional read data to the host device.

16. The non-transitory machine-readable medium of claim 15, wherein the location identifier comprises a logical block address of the read data.

17. The non-transitory machine-readable medium of claim 15, wherein the location identifier comprises a physical address of the read data on the memory device.

18. The non-transitory machine-readable medium of claim 15, wherein the operations further comprise:

in response to the indication being another value different from the certain value:

retrieving the read data from the memory device using the location identifier; and transmitting the read data to the host device.

19. The non-transitory machine-readable medium of claim 15, wherein the one or more location identifiers comprises a physical address of the additional read data on the memory device.

20. The non-transitory machine-readable medium of claim 15, wherein the one or more location identifiers comprise at least two non-contiguous addresses.

* * * * *